(12) United States Patent
Takasaki et al.

(10) Patent No.: US 6,715,401 B2
(45) Date of Patent: Apr. 6, 2004

(54) BRAKE BOOSTER (75) Inventors: Yoshiyasu Takasaki, Saitama-Ken (JP);
Hidefumi Inoue, Saitama-Ken (JP)

(73) Assignee: Bosch Automotive Systems Corporation, Tokyo (JP)

( * ) Notice: Subject to any disclaimer, the term of this patent is extended or adjusted under 35 U.S.C. 154(b) by 0 days.

(21) Appl. No.: 10/247,578

(22) Filed: Sep. 19, 2002

(65) Prior Publication Data
US 2003/0056643 A1 Mar. 27, 2003

(30) Foreign Application Priority Data

Sep. 25, 2001 (JP) ..................................... 2001/290488

(51) Int. Cl.$^7$ ............................................. B60T 13/52
(52) U.S. Cl. ..................................... 91/369.2; 91/369.3
(58) Field of Search .................. 60/554, 582; 91/369.2, 91/369.3, 376 R, 367

(56) References Cited
U.S. PATENT DOCUMENTS 5,893,316 A    4/1999  Inoue et al.
6,227,099 B1 *  5/2001  Kahrs et al. .................. 91/367
6,408,738 B1 *  6/2002  Harth et al. ................ 91/369.2
6,422,124 B1 *  7/2002  Schonlau et al. .......... 91/369.2
6,564,692 B2 *  5/2003  Inoue et al. ................ 91/369.3

FOREIGN PATENT DOCUMENTS

JP              11-115734        4/1999

* cited by examiner

Primary Examiner—Thomas E. Lazo
(74) Attorney, Agent, or Firm—Flynn, Thiel, Boutell & Tanis, P.C.

(57) ABSTRACT

During a normal brake operation, a brake reaction from a reaction disc is transmitted to a valve plunger through an outer plunger and an inner plunger. During an emergency brake operation, as a valve plunger is driven forward through a given stroke relative to a valve body, a tubular member retracts relative to the valve body. In a servo balance condition, which is reached subsequently, the valve plunger, retracts by an amount corresponding to the retraction of the tubular member, and the outer plunger abuts against a holder. A brake reaction from the reaction disc is transmitted to the valve plunger only through the inner plunger, allowing a booster ratio to be greater and a jumping quantity to be greater than during a normal brake operation. It is possible to increase an output from a brake booster 1 rapidly in immediate response to a quick depression of a brake pedal.

5 Claims, 4 Drawing Sheets

DURING NORMAL BRAKE OPERATION

Fig. 4

DURING EMERGENCY BRAKE OPERATION

Fig.5

BRAKE BOOSTER

FIELD OF THE INVENTION

The present invention relates to a brake booster, and more particularly, to a brake booster which allows an increased output to be obtained in a reliable manner when a force of depression of a reduced magnitude is applied to a brake pedal, as would be required in an emergency brake which requires a braking effort of an increased magnitude.

DESCRIPTION OF THE PRIOR ART

A brake booster is known in the art which allows an output of an increased magnitude to be obtained in response to a small force of depression applied to a brake pedal as in an emergency brake where a braking effort of an increased magnitude is required.

Conventional prior art proposed in the art for a brake booster which functions in this manner comprises either a scheme in which a jumping quantity, which is a rise in the output at the commencement of actuation, is increased to provide an output of an increased magnitude, or a scheme in which a booster ratio is increased to provide an output of an increased magnitude.

In the prior art practice, either one of the described schemes has been used to provide an output of increased magnitude during an emergency brake operation, but there has been a need for a brake booster which provides an increased rise in the output during the emergency brake operation by combining the both schemes.

SUMMARY OF THE INVENTION

Accordingly, it is an object of the present invention to provide a booster which is simple in construction and which is capable of increasing the output in immediate response to a quick depression of a brake pedal.

Specifically, the present invention relates to a brake booster comprising a valve body slidably disposed within a shell, a power piston mounted on the valve body, a constant pressure chamber and a variable pressure chamber defined forwardly and rearwardly of the power piston within the shell, a valve mechanism disposed within the valve body and which switchably controls the supply to or discharge from the variable pressure chamber of a fluid, an input shaft for operating the valve mechanism, and a reaction transmitting mechanism for transmitting a brake reaction which acts on an output shaft to the input shaft through the valve mechanism, the valve mechanism including a valve plunger connected to the input shaft and having an atmosphere valve seat, a first vacuum seat formed on the valve body, and a valve element which is adapted to be seated upon the atmosphere valve seat and the first vacuum valve seat. In accordance with the present invention, the brake booster further comprises a tubular member slidably mounted on the valve body and having a second vacuum valve seat which is juxtaposed with the first vacuum valve seat, an inoperative position retaining mechanism for retaining the tubular member at its most advanced position relative to the valve body when the booster is not actuated, and an operating mechanism for releasing the retention of the tubular member by the inoperative position retaining mechanism to allow it to retract relative to the valve body so that the second vacuum valve seat can be seated upon the valve element when the input shaft has moved forward through a given stroke relative to the valve body from its inoperative position, said reaction transmitting mechanism being arranged such that during a normal brake operation where the tubular member assumes its most advanced position relative to the valve body, it transmits a brake reaction to the valve plunger through a first reaction transmission path having a small booster ratio while during an emergency brake operation where the tubular member has retracted through a given stroke relative to the valve body, it transmits a brake reaction to the valve plunger through a second reaction transmission path having a greater booster ratio.

With the described arrangement, during the emergency brake operation where the brake pedal is quickly depressed, the operating mechanism releases the tubular member from the retention relative to the valve body, whereby the tubular member retracts rearward relative to the valve body to allow the second vacuum valve seat to be seated on the valve element. As a consequence, a separation between the atmosphere valve seat and the valve element, or the amount by which the atmosphere valve is opened increases. Consequently, the atmosphere is rapidly introduced into the variable pressure chamber through the atmosphere valve, allowing the output from the brake booster to rise rapidly. In a servo balance condition which is reached subsequently, the valve plunger retracts through an increased stroke relative to the valve body than during a normal brake operation, thus providing a grater jumping quantity than during a normal brake operation. At the same time, the brake reaction is transmitted to the valve plunger through the second reaction transmission path, whereby the output rises with a greater booster ratio than during the normal brake operation. In this manner, it is possible to increase the output from the brake booster in immediate response to a quick depression of a brake pedal. In other words, there is provided a brake booster which meets the need of the prior art with a simple construction.

Above and other objects, features and advantages of the present invention will become apparent from the following description of an embodiment thereof with reference to the attached drawings.

DETAILED DESCRIPTION OF THE EMBODIMENT

Figure 1:
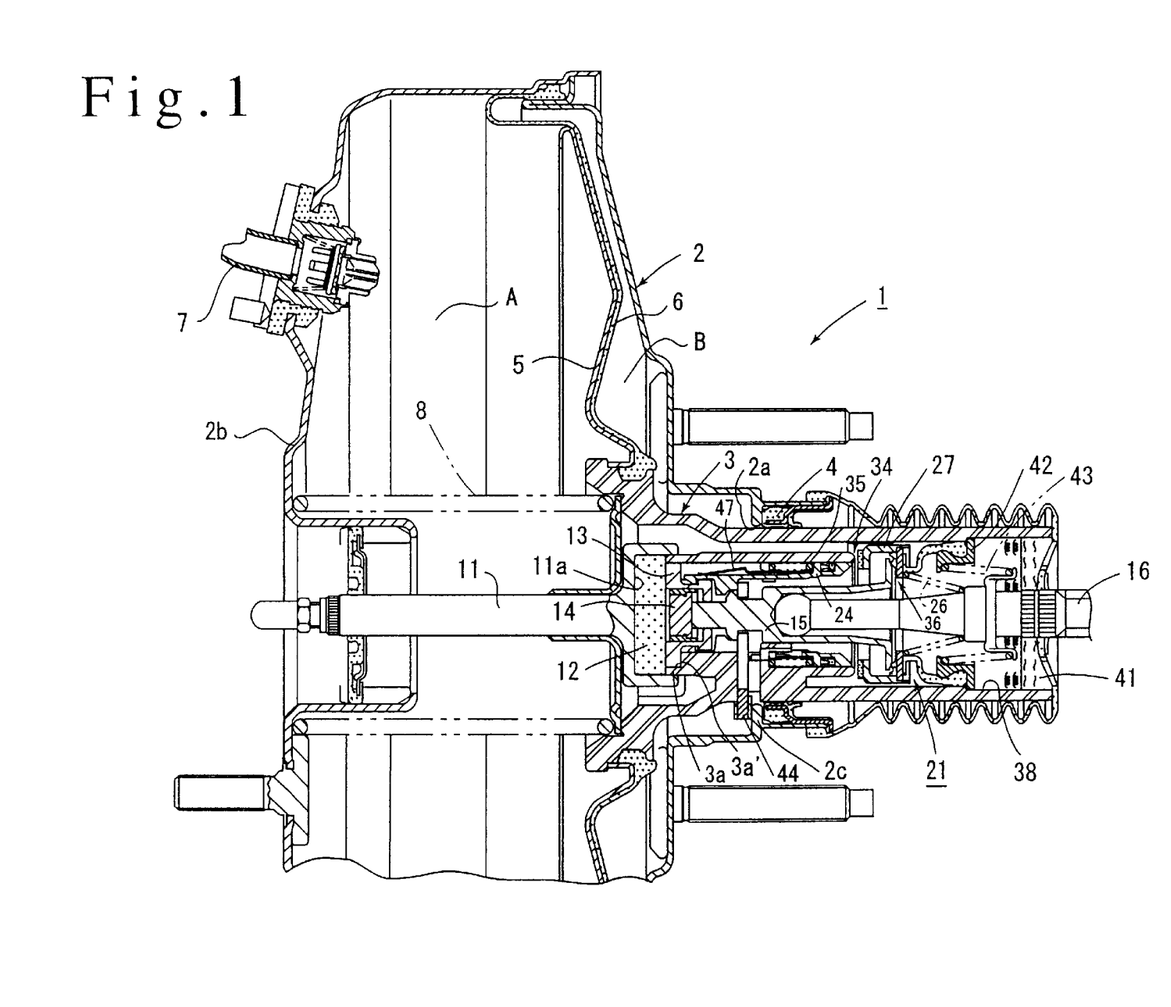
FIG. 1 is a cross section of an embodiment of the present invention.
Figure 2:
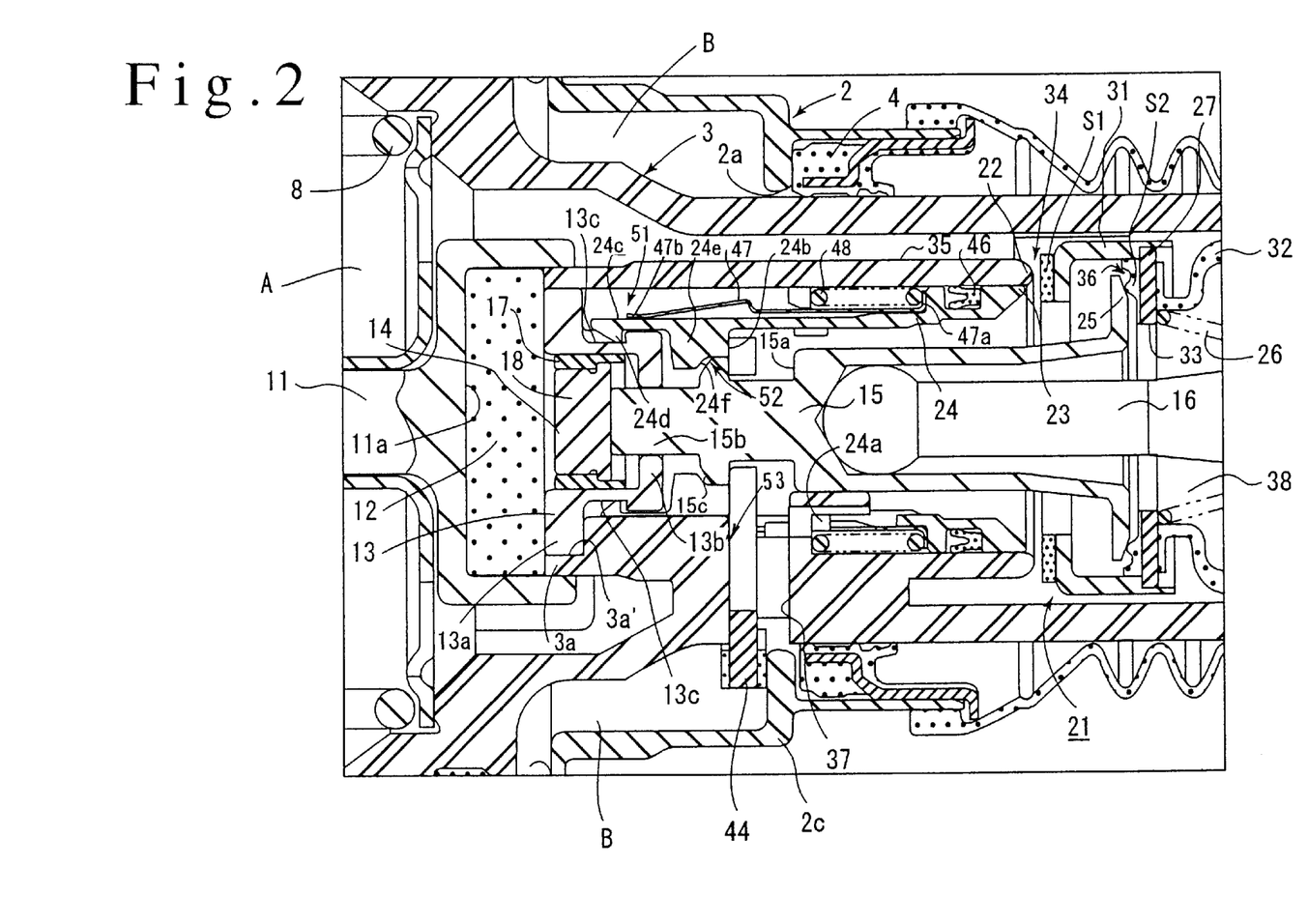
FIG. 2 is cross section, to an enlarged scale, of an essential part shown in FIG. 1.

The present invention will now be described with reference to the embodiment shown in the drawings. In FIGS. 1 and 2, a brake booster 1 includes a shell 2 in which a substantially tubular valve body 3 is slidably mounted. Around the outer periphery, the rear end of the valve body 3 projects externally through a rear opening 2a formed in the shell 2 while an annular seal member 4 disposed inside the opening 2a maintains a hermetic seal between the outer periphery of the valve body 3 toward the rear end and the opening 2a in the shell 2.

A power piston 5 is connected to the outer periphery of the valve body 3, and a diaphragm 6 is applied to the back surface of the power piston 5, thus defining a forwardly located constant pressure chamber A and a rearwardly located variable pressure chamber B within the shell 2. The shell 2 has a front wall 2b, to which a tubing 7 is connected for introducing a negative pressure, whereby a negative pressure is normally introduced into the constant pressure chamber A through the tubing 7. A return spring 8 is disposed within the constant pressure chamber A to urge the valve body 3 rearward normally. Accordingly, in the inoperative condition of the brake booster 1 shown in FIGS. 1 and 2, the valve body 3 which is urged by the return spring 8 remains at rest in its inoperative position shown.

It is to be noted that a housing for a master cylinder, not shown, is fitted into an opening in the front wall 2b of the shell 2, and an output shaft 11 which projects through this opening is engaged with the piston of the master cylinder.

At its front end, the inner periphery of the valve body 3 is formed with an annular projection 3a, the outer periphery of which is slidably fitted into a recess 11a formed in the base of the output shaft 11. The recess 11a of the output shaft 11 contains a reaction disc 12.

At its front end, the inner periphery of the annular projection 3a from the valve body 3 is formed with an annular recess 3a' which is continuous circumferentially and in which a holder 13 is fitted. The holder 13 is substantially cup-shaped and has a front end which is formed with a flange 13a. At its rear end, the holder 13 is formed with a stop 13b which extends radially inward, and the holder is also formed with an annular groove 13c of a given depth and width at a location rearward of the flange 13a.

The rear portion of the holder 13 is inserted inside the annular projection 3a on the valve body 3, and the flange 13a of the holder 13 is fitted into the annular recess 3a' while maintaining a hermetic seal therebetween. It is to be understood that the holder 13 substantially forms part of the valve body 3.

The holder 3 which is fitted inside the annular projection 3a in this manner is sized so that its front end face or the front end face of the flange 13a is flush with the end face of the annular projection 3a. The reaction disc 12 is held sandwiched between the end faces of these both members and the bottom of the recess 11a formed in the output shaft 11.

A plunger member 14 is slidably fitted in the inner periphery of the holder 13, and is disposed in abutment against the distal end of a valve plunger 15 which will be described later. When the brake booster 1 is actuated, a brake reaction which acts upon the output shaft 11 is transmitted to a brake pedal, not shown, through the reaction disc 12, the plunger member 14 and the valve plunger 15 and an input shaft 16.

In the present embodiment, the plunger member 14 comprises an outer plunger 17 which is cylindrical in configuration, and a solid cylindrical inner plunger 18 which is slidably fitted into the inner periphery of the outer plunger 17.

The outer plunger 17 has an axial size which is by a given amount longer than the axial size of the inner plunger 18, and the inner periphery of the outer plunger 17 has a greater diameter toward its rear end and a smaller diameter toward the front end.

On the other hand, the inner plunger 18 has a greater diameter at its rear end and a smaller diameter which is less than this greater diameter toward the front end. The portion of the inner plunger 18 having a smaller diameter has an axial size which is equal to the axial size of the portion of the outer plunger 17 having a smaller diameter, and the portion of the inner plunger 18 having the greater diameter has an axial size which is chosen to be on the order of one half the axial size of the portion of the outer plunger 17 having the greater diameter.

The inner plunger 18 thus constructed is slidably fitted into the inner periphery of the outer plunger 17 from the rear side, and under this condition, the outer periphery of the outer plunger 17 is slidably fitted into the inner periphery of the holder 13, thus maintaining the distal end of the valve plunger 15 in abutment against the rear end face of the inner plunger 18. Accordingly, in the inoperative condition shown, the front end faces of the inner plunger 18 and the outer plunger 17 are in a common plane, and are slightly spaced from the reaction disc 12. The rear end of the outer plunger 17 is spaced from the stop 13b of the holder 13.

When the brake pedal, not shown, is gently depressed in the inoperative condition shown in FIGS. 1 and 2, and the valve mechanism 21 to be described is operated to actuate the brake booster 1, the reaction disc 12 is axially compressed by the braking reaction acting on the output shaft 11. Accordingly, the rear end face of the reaction disc 12 bulges rearward to abut against the front end faces of the inner plunger 18 and the outer plunger 17.

Figure 3:
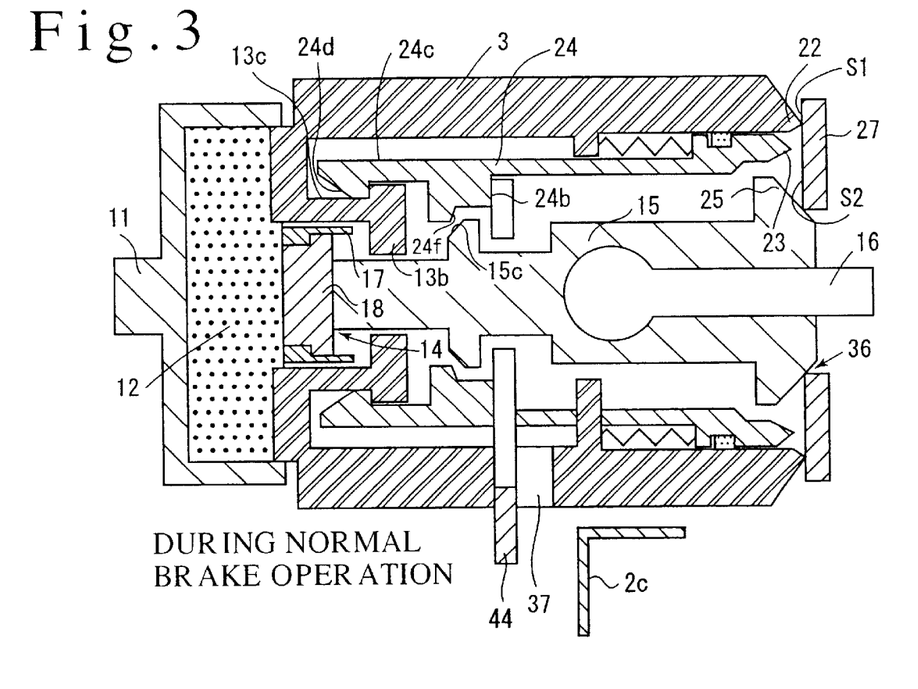
FIG. 3 is a schematic cross section illustrating a normal brake operation of the brake booster shown in FIG. 1.

As the reaction disc 12 abuts against the plunger member 14, the latter moves rearward within the holder 13. However, during the normal actuation of the brake booster 1, the rear end of the outer plunger 17 cannot abut against the stop 13b of the holder 13 (see FIG. 3). It is to be noted that the point in time when the reaction disc 12 abuts against the front end faces of the inner plunger 18 and the outer plunger 17 is represented by a jumping point JP1 shown in FIG. 5, and the brake reaction begins to be transmitted to a brake pedal, not shown, through the plunger member 14 (the inner plunger 18 and the outer plunger 17), the valve plunger 15 and the input shaft 16 from this time on. Subsequently, the output rises with a given small booster ratio SR1 which is determined by the external diameter of the reaction disc 12 and the external diameter of the outer plunger 17 (see FIG. 5).

By contrast, during the emergency brake operation where the brake pedal is quickly depressed to actuate the brake booster 1, the quick depression of the brake pedal causes the valve plunger 15 and the input shaft 16 to be driven forward through a given stroke or more relative to the valve body 3 and the holder 13. In this instance, when the servo balance condition is subsequently reached, the valve plunger 15 will be driven rearward relative to the valve body 3 through a stroke which is greater than a corresponding stroke which occurs during the normal brake operation. As a consequence, the reaction disc 12 is caused by the reaction from the output shaft 11 to bulge rearward to abut against the inner plunger 18 and the outer plunger 17 to move through a greater stroke rearwardly than during the normal operation, whereby the rear end of the outer plunger 17 abuts against the stop 13b of the holder 13 (see FIG. 4).

Figure 5:
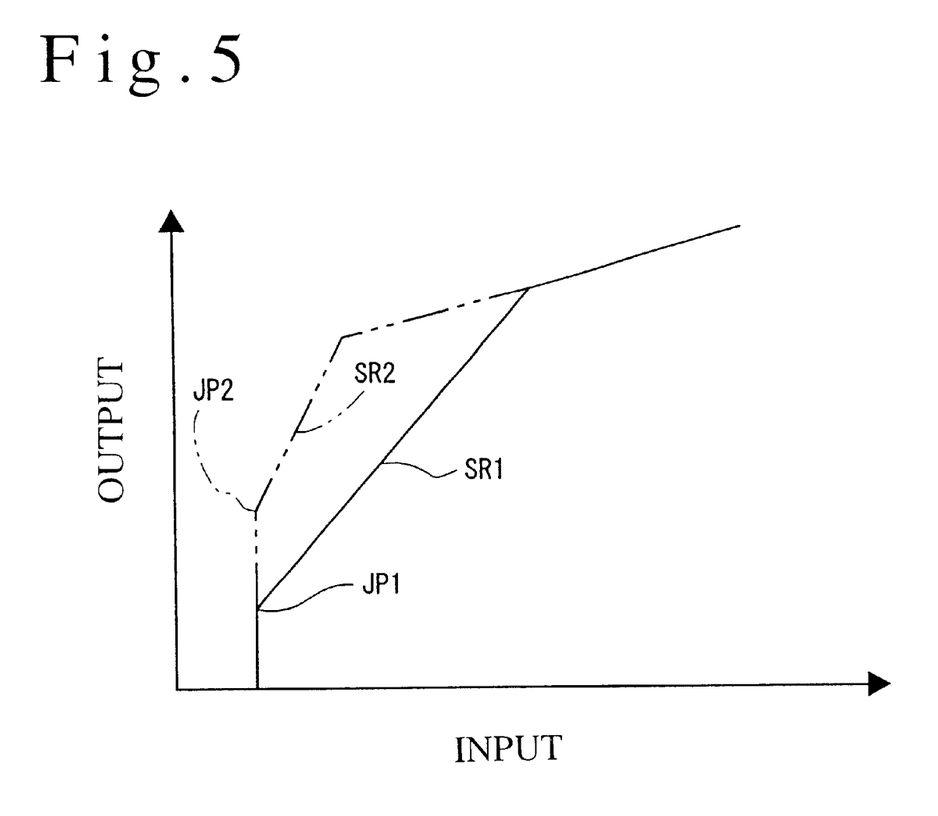
FIG. 5 graphically shows an input-output response of the brake booster shown in FIG. 1.

Thus, during the emergency brake operation, the jumping quantity will increase by an amount corresponding to an increment in the rearward movement of the inner plunger 18 and the outer plunger 17 as compared with such movement which occurs during the normal operation, and thus assumes a jumping point JP2 shown in FIG. 5. When the servo balance condition is reached subsequently, the outer plunger 17 abuts against the holder 13, and accordingly, the reaction from the reaction disc 12 is transmitted to the valve plunger 15 only through the inner plunger 18. As a consequence, the output from the brake booster 1 rises with a greater booster ratio SR2 which is determined by the external diameter of the reaction disc 12 and the external diameter of the inner plunger 18 (see FIG. 5).

As mentioned above, in the present embodiment, the plunger member 14 comprises the inner plunger 18 and the outer plunger 17, and during the normal brake operation, the reaction is transmitted to the valve plunger 15 through a first reaction transmission path including both the inner plunger 18 and the outer plunger 17 and which exhibits a small booster ratio. On the other hand, during the emergency brake operation, the reaction is transmitted from the reaction disc 12 to the valve plunger 15 through a second reaction transmission path only including the inner plunger 18 and having a greater booster ratio.

A valve mechanism 21 which switches a communication between the constant pressure chamber A and the variable pressure chamber B and between the variable pressure chamber B and the atmosphere is contained in the valve body 3.

The valve mechanism 21 comprises an annular, first vacuum valve seat 22 formed around the inner periphery of the valve body 3, a tubular member 24 slidably fitted into the inner periphery of the valve body 3 while maintaining a hermetic seal therewith and having a rear end on which a second vacuum valve seat 23 is formed, the valve plunger 15 which is inserted inside the tubular member 24 and having an atmosphere valve seat 25 formed on a rear portion thereof, and a valve element 27 which is adapted to be seated on the both vacuum valve seats 22, 23 and the atmosphere valve seat 25 from the rear side under the resilience of a spring 26.

The valve element 27 comprises a cylindrical first member 31 which is forwardly located and which is formed of a rigid body, and a second member 32 which is located rearwardly and which is formed of rubber and connected to the first member 31. An annular rubber is attached to the front side of the first member 31 to define a first seat S1. The second member 32 is provided with a plate 33 on its front side which is formed of a rigid body, and an annular rubber piece applied to the plate 33 defines a second seat S2. The atmosphere valve seat 25 formed on the valve plunger 15 is disposed inside the first member 31 so as to be disposed in opposing relationship with the second seat S2. The spring 26 is disposed between the plate 33 and the input shaft 16, thus normally urging the valve element 27 forward.

In the present embodiment, the both vacuum valve seats 22, 23 are juxtaposed so as to be adjacent to each other radially of the valve body 3. A combination of the both vacuum valve seats 22, 23 and the first seat S1 of the valve element 27 which moves into engagement therewith or out of disengagement therefrom defines a vacuum valve 34. A space located radially outward of the vacuum valve 34 communicates with the constant pressure chamber A through a constant pressure passage 35 formed in the valve body 3.

On the other hand, a combination of the atmosphere valve seat 25 formed on the valve plunger 15 and the second seat S2 of the valve element 27 which moves into engagement therewith or out of disengagement therefrom defines an atmosphere valve 36. A space located between the vacuum valve 34 and the atmosphere valve 36 communicates with the variable pressure chamber B through a radially extending variable pressure passage 37 which is formed in the valve body 3.

A space located radially inward of the atmosphere valve 36 communicates with the atmosphere through an atmosphere passage 38 formed in the valve body 3 and a filter 41 disposed therein.

The axial portion of the valve plunger 15 is pivotally connected with the distal end of the input shaft 16, and a spring 43 having a greater resilience than the spring 26 is disposed between a retainer 42 fitted around the valve body 3 and the outer periphery of the input shaft 16. The other end of the input shaft 16 is connected to a brake pedal, not shown.

A key member 44, which is known in itself, is inserted into the variable pressure passage 37 in the valve body 3, and is passed through a radial opening 24a in the tubular member 24 and an opening in a tubular resilient member 47, to be described later, before it is engaged with an engaging portion 15a of the valve plunger 15.

Because the valve body 3 is normally urged rearward by the return spring 8, in the inoperative condition of the brake booster 1 shown in FIGS. 1 and 2, the key member 44 abuts against the rear wall 2c of the shell 2. The front end face of the variable pressure passage 37 abuts against the key member 44, and a stepped end face 24b of an annular step 24e formed on the tubular member 24 and a front end face of the engaging portion 15a of the valve plunger 15 abut against the key member 44.

When the key member 44 abuts against the rear wall 2c of the shell 2, the key member 44 and the valve plunger 15 are maintained at given axial positions relative to the valve body 3. In this manner, a lost motion of the input shaft 16 at the commencement of operation of the brake booster 1 is reduced.

In the inoperative condition, the second seat S2 of the valve element 27 is seated upon the atmosphere valve seat 25 to close the atmosphere valve 36 while the first seat S1 of the valve element 27 is removed from the both vacuum valve seats 22, 23 to open the vacuum valve 34. Therefore, in this inoperative condition, the chambers A and B communicate with each other, and a negative pressure is introduced into the both chambers A and B.

In this inoperative condition, the rear end face of the reaction disc 12 is slightly spaced from the front end face of the plunger member 14 which opposes thereto. By contrast, when the brake booster 1 is actuated and the input shaft 16 and the valve plunger 15 are driven forward, a reaction from the output which acts upon the output shaft 11 causes the reaction disc 12 to bulge rearward, whereby the end face of the reaction disc 12 abuts against the plunger member 14 (the front end faces of the inner plunger 18 and the outer plunger 17). From this jumping point on, the reaction of the output acting upon the output shaft 11 begins to be transmitted to a brake pedal, not shown, through the reaction disc 12, the plunger member 14, the valve plunger 15 and the input shaft 16 as mentioned previously.

The tubular member 24 is formed with a portion of a greater diameter around the outer periphery toward the rear end thereof, and a seal member 46 is mounted around the outer peripheral surface of the portion of the increased diameter in order to maintain a hermetic seal between the inner periphery of the valve body 3 and the portion of the greater diameter of the tubular member 24.

At a location forwardly of the portion of the greater diameter, the outer periphery of the tubular member 24 has the tubular resilient member 47 fitted therearound. The rear end of the tubular resilient member 47 is formed as a radially outwardly extending flange 47a, which is disposed in abutment against the portion of the tubular member 24 having the greater diameter from the front side thereof. A spring 48 is disposed between the flange 47a which assumes such abutting position and the opposing stepped end face of the valve body 3, thus normally urging the tubular member 24 and the tubular resilient member 47 rearward in an integral manner.

An axially front end 47b of the tubular resilient member 47 is formed with a plurality of axially extending notches which are circumferentially spaced apart, and has a portion of an increased diameter at a location axially rearward of these notches. In this manner, the front end 47b of the tubular resilient member 47 function as a leaf spring, which urges the front portion of the tubular member 44 radially inward.

At a given axial position, the tubular resilient member 47 is formed with an opening, which allows the key member 44 to pass therethrough.

The tubular member 24 is formed of a synthetic resin, and a front end thereof is formed with a plurality of axially extending notches which are circumferentially spaced apart. In this manner, a plurality of deformable portions 24c which undergo an elastic deformation in a radial direction are formed as spaced apart in the circumferential direction. These deformable portions 24c are urged radially inward by the front end 47b of the resilient member 47.

Each deformable portion 24c is formed with an engaging portion 24d which projects inward on the inside of the front end thereof. The engaging portion 24d is formed to be triangular in axial cross section, including a rear side which has a radially extending stepped end face and a front side which is formed as a sloped surface having an angle of inclination of 45°.

Each deformable portion 24c is fitted around the outer periphery of the holder 13 from the rear side, and each engaging portion 24d is engaged with the annular groove 13c in the holder 13. Since the tubular member 24 is normally urged rearward by the spring 48, the tubular member 24 stays at rest at a position where the stepped end face of the engaging portion 24d abuts against the rear end face of the annular groove 13c in the holder 13. This represents a condition of the tubular member 24 where it is maintained most forwardly relative to the valve body 3. At this time, the second vacuum valve seat 23 formed on the rear end of the tubular member 24 is located slightly forward of the first vacuum valve seat 22 which is located adjacent thereto and radially outward thereof. In the present embodiment, a combination of the annular groove 13c in the holder 13, the deformable portion 24c and the engaging portion 24d of the tubular member 24 and the tubular resilient member 47 constitutes together an inoperative position retaining mechanism 51 which retains the tubular member 24 at its inoperative position where it is located most forward relative to the valve body 3.

An annular step 24e of the tubular member 24 has an inner peripheral surface which has a reduced diameter toward the front end and which has an increased diameter toward the rear end, with a boundary therebetween being formed as a tapered surface 24f which increases its diameter toward its rear side.

In the present embodiment, the valve plunger 15 includes a foremost portion 15b of a reduced diameter, followed by a portion of a medium diameter which is located rearward thereof. An annular groove is formed in the outer periphery of the portion of the medium diameter to define the engaging portion 15a. The rear end of the valve plunger 15 is formed as a flange which extends radially outward and the rear end face of which is formed as the atmosphere valve seat 25. It will be noted that toward the front end, the portion of the medium diameter is formed with a tapered surface 15c which increases its diameter toward the rearside.

In the axial portion of the rear end, the valve plunger 15 is formed with a bottomed opening, into which the distal end of the input shaft 16 is fitted for pivotal connection. The valve plunger 15 constructed in the manner mentioned above is inserted into the tubular member 24 from the rear side, the foremost portion 15b of the reduced diameter is slidably extended through the inner periphery of the stop 13b of the holder 13, and the front end face of the foremost portion 15b of the reduced diameter is disposed in abutment against the inner plunger 18 of the plunger member 14.

As will be described later, during the normal brake operation, the input shaft 16 and the valve plunger 15 undergo a forward movement through a stroke which is less than the given stroke relative to the valve body 3, and accordingly, the tapered surface 15c of the valve plunger 15 does not abut against the tapered surface 24f of the tubular member 24. Consequently, the deformable portions 24c of the tubular member 24 cannot be expanded in diameter, and the engaging portions 24d remain engaged with the annular groove 13c. Consequently, the tubular member 24 is maintained in its inoperative position where it is located foremost relative to the valve body 3 (see FIG. 3).

By contrast, during the emergency brake operation where the brake pedal is quickly depressed, the input shaft 16 and the valve plunger 15 are driven forward through an increased stroke relative to the valve body 3, as compared to the stroke which occurs during the normal brake operation, and accordingly, the tapered surface 15c of the valve plunger 15 abuts against the tapered surface 24f of the tubular member 24, thus causing the deformable portions 24c of the tubular member 24 to be expanded in diameter. As a consequence, the engaging portions 24d are disengaged from the annular groove 13c, thus releasing the connection of the tubular member 24 with the valve body 3. Concomitantly, the tubular member 24 as urged by the spring 48 retracts rearward relative to the valve body 3. The second vacuum valve seat 23 formed on the tubular member 24 then abuts against the first seat S1 of the valve element 27, causing the valve element 27 to retract rearward. The tubular member 24 comes to a stop when the stepped end face 24b thereof abuts against the key member 44 which in turn abuts against the rear end face of the variable pressure passage 37 and is maintained at such position. As a consequence, the opening to which the atmosphere valve 36 comprising the atmosphere valve seat 25 and the second seat S2 opens becomes greater than the opening which occurs during the normal brake operation. In addition, at the servo balance condition which is reached subsequently, the valve plunger 15 will be moved rearward relative to the valve body 3 and the holder 13 through an increased stroke as compared with a stroke which occurs during the normal brake operation, by an amount by which the valve element 27 is driven rearward by the tubular member 24. Consequently, the plunger member 14 which abuts against the reaction disc 12 and is driven back thereby and the valve plunger 15 will be moved rearward relative to the valve body 3 and the holder 13, and the outer plunger 17 abuts against the radial portion 24a of the holder 13. In other words, the brake reaction is transmitted to the valve plunger 15 from the reaction disc 12 only through the inner plunger 18.

It will be understood from the foregoing description that in the present embodiment, an operating mechanism 52 is formed by the tapered surface 24f of the tubular member 24, the tapered surface 15c of the valve plunger 15 and the spring 48, and the operating mechanism 52 serves releasing the tubular member 24 which has been retained in its inoperative position where it is located foremost relative to the valve body 3 by the action of the inoperative position retaining mechanism 51, allowing the tubular member 24 to move rearward relative to the valve body 3.

When the operating mechanism 52 releases the retention by the inoperative position retaining mechanism 51 and allows the tubular member 24 to move rearward relative to the valve body 3, the retracting end of the tubular member 24 relative to the valve 3 is defined by the key member 44, the stepped end face 24b of the tubular member 24 and the variable pressure passage 37. Thus it will be seen that the key member 44, the stepped end face 24b of the tubular member 24 and the variable pressure passage 37 form together a restricting mechanism 53 which restricts the rearward retracting position of the tubular member 24 and retains it at its retracted position.

With the described arrangement, in the inoperative condition of the brake booster 1 shown in FIGS. 1 and 2, the engaging portion 15a of the valve plunger 15 abuts against the key member 44 which is in abutment against the rear wall 2c of the shell 2, whereby the valve plunger 15 is located at its retracted end which is rearmost in the shell 2. At this time, the tubular member 24 is also located at its retracted end where the stepped end face 24b abuts against the key member 44. The tapered surface 15c of the valve plunger 15 is located rearward of and opposes the tapered surface 24f of the tubular member 24 at this time, and a clearance is maintained therebetween.

In the inoperative condition, the second seat S2 of the valve element 27 is seated upon the atmosphere valve seat 25 to close the atmosphere valve 36. The engaging portions 24d of the tubular member 24 are engaged with the annular groove 13c in the holder 13. In other words, the tubular member 24 is retained at its advanced position relative to the valve body 3 by means of the inoperative position retaining mechanism 51. Accordingly, the second vacuum valve seat 23 formed on the tubular member 24 is located slightly forward of the first vacuum valve seat 22, and the both vacuum valve seats 22, 23 are removed from the first seat S1 of the valve element 27 to open the vacuum valve 34. Thus, the chambers A and B communicate with each other, and a negative pressure is introduced into the both chambers A and B. In this inoperative condition, the rear end face of the reaction disc 12 is slightly spaced from the plunger member 14 (the inner plunger 18 and the outer plunger 17). The rear end face of the outer plunger 17 of the plunger member 14 is spaced form the stop 13b of the holder 13.

During Normal, Gentle Brake Operation

When the brake pedal, not shown, is gently depressed in the inoperative condition, the input shaft 16 and the valve plunger 15 are gently driven forward in response thereto. During the normal, gentle depression of the brake pedal, the valve plunger 15 is driven forward through less than a given stroke relative to the valve body 3 and the holder 13, and accordingly, the tapered surface 15c of the valve plunger 15 approaches, but does not abut against the tapered surface 24f of the tubular member 24. Hence, the deformable portions 24c of the tubular member 24 cannot be deformed radially outward, and the engaging portions 24d remain engaged with the annular groove 13c in the holder 13. Thus, the tubular member 24 is retained to be connected at its advanced position relative to the valve body 3 by the inoperative position retaining mechanism 51.

Accordingly, the positional relationship between the both valve seats 22, 23 remains unchanged from the inoperative condition shown in FIG. 2. The first seat S1 of the valve element 27 is seated upon the first vacuum valve seat 22 which assumes such condition while the atmosphere valve seat 25 is removed from the second seat S2 of the valve element 27 to open the atmosphere valve 36.

When the vacuum valve 34 is closed while the atmosphere valve 36 is opened in this manner, the atmosphere is introduced into the variable pressure chamber B through the variable pressure passage 37. Accordingly, the valve body 3 and the like are driven forward to actuate the brake booster 1.

The brake reaction from the output shaft compresses the reaction disc 12, the rear end face of which bulges to abut against the plunger member 14, thus slightly driving it rearward within the holder 13. However, the rear end of the outer plunger 17 of the plunger member 14 does not abut against the stop 13b of the holder 13 (see FIG. 3).

Accordingly, the jumping point is represented by the point JP1 shown in FIG. 5 where the reaction disc 12 abuts against the plunger member 14, and from this time on, the brake reaction begins to be transmitted to the brake pedal, not shown through the valve plunger 15 and the input shaft 16. Since the rear end of the outer plunger 17 does not abut against the stop 13b of the holder 13 as mentioned above, the brake reaction is transmitted to the valve plunger 15 from the reaction disc 12 through both the inner plunger 18 and the outer plunger 17. Subsequent to the jumping point JP1 where the reaction begins to be transmitted to the brake pedal, the output rises with a servo ratio indicated by SR1, as shown in FIG. 5.

In this manner, when the brake booster 1 is actuated by a normal, gentle depression of the brake pedal, the tubular member 24 is retained at its inoperative position where it is located foremost relative to the valve body 15 by the inoperative position retaining mechanism 51.

If the brake pedal is now released after the brake booster has one been actuated, the valve plunger 15 and the input shaft 16 retract rearward, and the key member 44 abuts against the wall 2c of the shell 2 and comes to a stop. Subsequently, the front end face of the engaging portion 15a of the valve plunger 15 comes to a stop upon abutment against the key member 44, and thereafter, the front end face of the variable pressure passage 37 of the valve body 3 and the stepped end face 24b of the tubular member 24 come to a stop by abutment against the key member 44. Accordingly, the valve body 3 and the tubular member 24 also return to their inoperative positions shown. The plunger member 14 and the reaction disc 12 also return to their inoperative positions.

During Emergency Brake Operation

When the brake pedal is quickly depressed in the inoperative condition shown in FIGS. 1 and 2, the valve plunger 15 and the input shaft 16 are driven more than through a given stroke forwardly relative to the valve body 3 and the holder 13.

Accordingly, the first seat S1 of the valve element 27 is initially seated upon the first vacuum valve seat 17 to close the vacuum valve 34 while the atmosphere valve seat 25 is removed from the second seat S2 of the valve element 27 to open the atmosphere valve 36. The tapered surface 15c of the valve plunger 15 abuts against the tapered surface 24f of the tubular member 24 and continues to be driven forward, whereby the deformable portions 24c of the tubular member 24 are expanded in diameter, whereby the engaging portions 24d are disengaged from the annular groove 13c.

Figure 4:
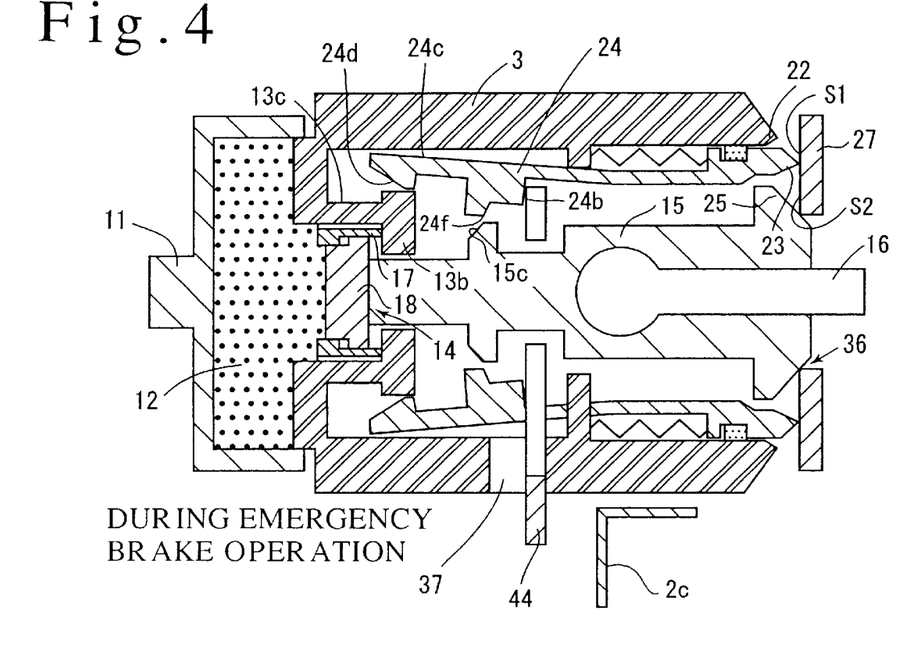
FIG. 4 is a schematic cross section illustrating an emergency brake operation of the brake booster shown in FIG. 1.

Accordingly, the tubular member 24 which is urged rearward by the spring 48 retracts rearward relative to the valve body 3 and the holder 13, and the second vacuum valve seat 23 becomes seated upon the first seat S1 of the valve seat 27, causing the valve element 27 to retract rearward (see FIG. 4). The stepped end face 24b of the tubular member 24 abuts against the key member 44, and ceases to retract at the position where the key member 44 abuts against the rear end face of the variable pressure passage 37, and thus is retained at such position.

In this manner, a greater separation is achieved between the atmosphere valve seat 25 and the second seat S2, and accordingly, the atmosphere valve 36 which is defined by these members are maintained to a greater opening than during the normal brake operation. Accordingly, the atmosphere is rapidly introduced into the variable pressure chamber B, allowing the brake booster 1 to generate an output of an increased magnitude rapidly.

When the servo balanced condition is reached subsequently, the vacuum valve 34 and the atmosphere valve 36 are both closed, and therefore it will be seen the valve plunger 15 has been moved more rearward relative to the valve body 3 than during the normal brake operation in a manner corresponding to the amount by which the valve element 27 has been driven rearward by the tubular member 24. Accordingly, the brake reaction from the output shaft 11 causes the rear end face of the reaction disc 12 to abut against the inner plunger 18 and the outer plunger 17, both of which are driven rearward within the holder 13, whereby the rear end of the outer plunger 17 abuts against the stop 13b of the holder 13 (see FIG. 4).

Thus it will be seen that during the emergency brake operation, the amount by which the reaction disc 12 bulges rearward will be greater in a manner corresponding to the increment in the rearward movement of the inner plunger 18 and the outer plunger 17 as compared with the rearward movement occurring during the normal brake operation, and accordingly, the jumping quantity will be greater than during the normal brake operation, as indicated by point JP2 in FIG. 5. When the servo balance condition is reached subsequently, because the outer plunger 17 abuts against the holder 13, the brake reaction from the reaction disc 12 is transmitted to the valve plunger 15 only through the inner plunger 18, allowing the output to rise with the greater booster ration SR2 than during the normal brake operation.

When the brake pedal is released after the emergency brake operation, the input shaft 16 and the valve plunger 15 retract, and the key member 44 abuts against the wall 2c of the shell 2 and comes to a stop. As a consequence, the tubular member 24 and the valve plunger 15 return to their inoperative positions shown, and the valve body 3 and the holder 13 retract in a retarded relationship thereto, and the valve body 3 comes to a stop and returns to its inoperative position when the front end face of the variable pressure passage 37 abuts against the key member 44. During this process, the tubular member 24 will be driven forward relative to the valve body 3, and accordingly, the sloped surface of the engaging portion 24d of the tubular member 24 is fitted into the periphery of the holder 13 toward its rear end before it slides forwardly, whereupon the engaging portion 24d becomes engaged with the annular groove 13c formed in the holder 13, thus returning to the inoperative position shown in FIG. 2. Concomitantly, the inner plunger 18 and the outer plunger 17 of the plunger member 14 move forward within the holder 13 to return to their inoperative positions shown in FIG. 2.

As described above, with the present embodiment, it is possible to open the atmosphere valve to a greater opening and to increase the jumping quantity and the booster ratio so as to allow an output of a greater magnitude to be obtained rapidly during the emergency brake operation, with an arrangement which is simple enough to add the tubular member 24, the holder 13, the plunger member 14 (the outer plunger 17 and the inner plunger 18) and the spring 48 to a conventional brake booster.

In addition, by adjusting the size of the plunger member 14 (the outer plunger 17 and the inner plunger 18), the jumping quantity and the booster ratio during the emergency brake operation can be suitably adjusted.

It will be seen that the brake booster 1 of the present embodiment uses a reduced number of parts as compared with a conventional arrangement, and thus is simple in assembly and can be manufactured inexpensively.

In the present embodiment, the tubular member 24 is connected to the valve body 3 by the inoperative position retaining mechanism 51 during the normal brake operation while the tubular member 24 is maintained at its retracted position relative to the valve body 3 by the restricting mechanism 53 during the emergency brake operation, thus contributing to stabilizing the jumping quantity and the booster ratio. It should be understood that in the arrangement of the present invention, the reaction transmitting mechanism which includes the reaction disc 12, the holder 13, the outer plunger 17 and the inner plunger 18 is not limited to the inoperative position retaining mechanism 51 and the operating mechanism 52 for the tubular member 24 of the present embodiment, but any arrangement can be used which allows the tubular member 24 to be maintained foremost relative to the valve body 3 during the normal brake operation and to allow the tubular member 24 to be moved rearward relative to the valve body 3 to cause the second vacuum valve seat 23 to be seated upon the valve element 31 during the emergency brake operation.

While the embodiment has been described above as applied to the brake booster 1 of a single type, it should be understood that the invention is equally applicable to a tandem brake booster including two pairs of constant and variable pressure chambers or a brake booster of triple type having three pairs of constant and variable pressure chambers.

While the invention has been described above in connection with a preferred embodiment thereof, it should be understood that a number of changes, modifications and substitutions therein are possible from the above disclosure without departing from the spirit and scope of the invention defined by the appended claims.

What is claimed is:

1. A brake booster including a valve body slidably disposed within a shell, a power piston mounted on the valve body, a constant pressure chamber and a variable pressure chamber formed forwardly and rearwardly, respectively, of the power piston within the shell, a valve mechanism disposed within the valve body for switchably controlling the supply to or discharge from the variable pressure chamber of a fluid, an input shaft for operating the valve mechanism, and a reaction transmitting mechanism for transmitting a brake reaction from an output shaft to the input shaft through the valve mechanism, the valve mechanism including a valve plunger connected to the input shaft and having an atmosphere valve seat thereon, a first vacuum valve seat formed on the valve body, and a valve element which can be seated upon the atmosphere valve seat and the first vacuum valve seat;

the brake booster further comprising
a tubular member slidably mounted on the valve body,
the tubular member being formed with a second vacuum valve seat which is juxtaposed with the first vacuum valve seat;

an inoperative position retaining mechanism for retaining the tubular member at a position where it is located most advanced relative to the valve body when it is inoperative;

and an operating mechanism for releasing the tubular member from the retention by the inoperative position retaining mechanism and for allowing the tubular member to retract relative to the valve body so that the second vacuum valve seat is seated upon the valve element when the input shaft has been driven forward through a given stroke relative to the valve body from its inoperative position;

the reaction transmitting mechanism being arranged such that during a normal brake operation where the tubular member assumes the position which is most advanced relative to the valve body, it transmit a brake reaction to the valve plunger through a first reaction transmission path having a small booster ratio while during an emergency brake operation where the tubular member assumes a position in which it has retracted through a given stroked relative to the valve body, it transmits the brake reaction to the valve plunger through a second reaction transmission path having a greater booster ratio.

2. A brake booster according to claim 1 in which the reaction transmitting mechanism comprises a reaction disc interposed between the output shaft and a front end face of the valve body, and a plunger member disposed between the reaction disc and the valve plunger, the plunger member comprising an inner plunger disposed for abutment against the valve plunger and an outer plunger slidably fitted around the outer periphery of the inner plunger, the arrangement being such that during a normal brake operation where the tubular member is retained at its position in which it is most advanced relative to the valve body by the inoperative position retaining mechanism, the brake reaction is transmitted to the valve plunger through the first reaction transmission path including the reaction disc, the inner plunger, and the outer plunger while during an emergency brake operation where the tubular member is at its position which is retracted through a given stroke relative to the valve body, the brake reaction is transmitted to the valve plunger through the second reaction transmission path including the reaction disc and either one of the inner plunger and the outer plunger.

3. A brake booster according to claim 1 in which the inoperative position retaining mechanism comprises an elastic deformation portion at the front end of the tubular member, an engaging portion disposed inside the elastic deformation portion, and an engaging groove formed in the valve body and engaged by the engaging portion, the tubular member being retained at its position in which it is most advanced relative to the valve body by an engagement of the engaging portion with the engaging groove.

4. A brake booster according to claim 3 in which the operating mechanism comprises a step formed inside the elastic deformation portion of the tubular member, a tapered portion on the outer periphery of the valve plunger, and a resilient member for urging the tubular member rearward, the arrangement being such that when the valve plunger is driven forward through a given stroke relative to the valve body, the tapered portion of the valve plunger abuts against the step on the elastic deformation portion to cause an elastic deformation of the elastic deformation portion radially outward to cause the engaging portion to be disengaged from the engaging groove, whereby the tubular member as urged by the resilient member retracts relative to the valve body.

5. A brake booster according to claim 3 in which the inoperative position retaining mechanism comprises a second resilient member which urges the elastic deformation portion radially inward.

* * * * *